(12) United States Patent
Saha

(10) Patent No.: US 11,586,970 B2
(45) Date of Patent: Feb. 21, 2023

(54) SYSTEMS AND METHODS FOR INITIAL LEARNING OF AN ADAPTIVE DETERMINISTIC CLASSIFIER FOR DATA EXTRACTION

(71) Applicant: WIPRO LIMITED, Bangalore (IN)

(72) Inventor: Samrat Saha, Bangalore (IN)

(73) Assignee: Wipro Limited, Bangalore (IN)

( * ) Notice: Subject to any disclaimer, the term of this patent is extended or adjusted under 35 U.S.C. 154(b) by 1262 days.

(21) Appl. No.: 15/922,983

(22) Filed: Mar. 16, 2018

(65) Prior Publication Data

US 2019/0236492 A1  Aug. 1, 2019

(30) Foreign Application Priority Data

Jan. 30, 2018 (IN) .............................. 201841003537

(51) Int. Cl.
  *G06N 20/00* (2019.01)
  *G06F 16/35* (2019.01)
  *G06F 40/40* (2020.01)

(52) U.S. Cl.
  CPC ............ *G06N 20/00* (2019.01); *G06F 16/35* (2019.01); *G06F 40/40* (2020.01)

(58) Field of Classification Search
  CPC .......... G06N 20/00; G06F 16/35; G06F 40/40
  See application file for complete search history.

(56) References Cited

U.S. PATENT DOCUMENTS

| 2016/0085741 | A1 | 3/2016 | Blanchflower | |
| 2017/0300565 | A1* | 10/2017 | Calapodescu | G06F 16/278 |
| 2018/0129944 | A1* | 5/2018 | Meunier | G06N 7/005 |
| 2019/0354544 | A1* | 11/2019 | Hertz | G06F 16/334 |

OTHER PUBLICATIONS

Christ, Patrick Ferdinand et al. "Automatic liver and lesion segmentation in CT using cascaded fully convolutional neural networks and 3D conditional random fields." In International Conference on Medical Image Computing and Computer-Assisted Intervention, pp. 415-423. Springer, Cham, 2016. (Year: 2016).*
Ghosh, Sucheta, Richard Johansson, Giuseppe Riccardi, and Sara Tonelli. "Shallow discourse parsing with conditional random fields." In Proceedings of 5th International Joint Conference on Natural Language Processing, pp. 1071-1079. 2011. (Year: 2011).*

\* cited by examiner

*Primary Examiner* — Casey R. Garner
(74) *Attorney, Agent, or Firm* — Finnegan, Henderson, Farabow, Garrett & Dunner, LLP

(57) ABSTRACT

This disclosure relates to initial learning of a classifier for automating extraction of structured data from unstructured or semi-structured data. In one embodiment, a method is disclosed, comprising: identifying at least one expected relation class associated with at least one expected relation data; populating at least one expected name entity data from the at least one identified expected relation class; generating training data by tagging the at least one expected relation data and the at least one identified expected relation class with unstructured or semi-structured data; generating feedback data for a relation data and relation class, using a convergence technique on the tagged training data; retuning a NE classifier cluster and a relation classifier cluster by continuously tagging new training data or generating new cascaded expression for a deterministic classifier and a statistical classifier; and extracting the structured data when the NE classifier cluster and the relation classifier cluster converge.

13 Claims, 7 Drawing Sheets

SYSTEMS AND METHODS FOR INITIAL LEARNING OF AN ADAPTIVE DETERMINISTIC CLASSIFIER FOR DATA EXTRACTION

PRIORITY CLAIM

This U.S. patent application claims priority under 35 U.S.C. § 119 to: India Application No. 201841003537, filed Jan. 30, 2018. The entire contents of the aforementioned application are incorporated herein by reference for all purposes.

TECHNICAL FIELD

This disclosure relates generally to systems and methods for automating data extraction of structured data from unstructured or semi-structured data, and more particularly for initial learning of an adaptive deterministic classifier for data extraction.

BACKGROUND

Natural language processing (NLP) is a field of Artificial Intelligence (AI), which facilitates the exchange of meaningful data between machines and humans. Machine extractible data largely depends on the structure, for example HTML, pdf, or handwritten images, of the source data. Since a machine's capability of extracting data may be limited on the structure of the source data, improperly understanding data alignment and sentence identification may lead to data corruption.

Data extraction, usually carried out by an NLP, is generally a process of extracting structured data that is meaningful to a human from unstructured or semi structured data. Extraction of the structured data has subtasks, for example, a named entity recognition (NER) task and a relationship extraction (RE) task. NER is a process of understanding entity names like person, organization, designation, etc. and assigning unique classes or categories, for example PERSON, ORGANIZATION, LOCATION etc. to the entity names. RE is a process of identifying a relationship between entity names. For example, for a sentence "John Q. Smith is the CEO of ABC Corp.", RE may find a relation triplet in the form [Subj., Predicate, Obj.] to populate as [John Q. Smith, CEO, ABC Corp.]. The above example signifies a relationship of a CEO of an organization.

Precision and recall are primary measures of information extraction, and signify accuracy of an information extraction system. Precision may be defined as the fraction of retrieved named entities or relations relevant to the query.

Precision=({relevant entities or relations}∩{retrieved entities or relations})/{retrieved entities or relations}

Recall may be defined as the fraction of relevant entities or relations successfully retrieved.

Recall=({retrieved entities or relations}∩{retrieved entities or relations})/{relevant entities or relations}

Currently, systems and methods to extract structured data from unstructured or semi-structured data to get named entities and relation triplets include rule-based systems, probabilistic classifiers, such as naïve Bayesian classifiers, and sequential classifiers, such as Conditional Random Field (CRF) classifiers, The inventors here have recognized several technical problems with such conventional systems, as explained below.

Rule-based systems suffer from the drawback that it is not possible to understand a whole corpus for a specific business domain to write regular expressions or rules. Further, rule-based systems cannot generalize unseen data or different business domains where the structure of the data and entities are unknown.

Probabilistic classifiers, including naïve Bayes, and CRF classifiers are not adequate in separating data to generate high precision and recall systems, For example, naïve Bayesian models assume that the features of a class are conditionally independent given the class, due to which they fail to generalize to unseen data and ambiguous features. Further, probabilistic classifiers require a large set of tagged sample data (training data), where entities and relations are correctly labeled. Currently, this large set of tagged data is generated manually, and therefore requires inordinate effort to label correctly, and is highly susceptible to manual errors. Such errors can be fatal to the training of probabilistic classifier systems, and may, in some instances, cause exceptions preventing the classifier to converge on a solution in the learning process. Moreover, the sample data should be a good enough representation of the whole corpora, which paradoxically defeats the purpose of the classifiers here, which is to extract information from unknown unstructured data, Finally, existing classifiers fail to generate a sufficiently high precision or recall. This disallows their deployment for highly sensitive information extraction tasks in the business domain, where incorrectly fetched entities or relations can have severe real-world consequences.

SUMMARY

Embodiments of the present disclosure present technological improvements as solutions to one or more of the above-mentioned technical problems recognized by the inventors in conventional systems. For example, in one embodiment, a processing system for data extraction is disclosed, comprising: one or more hardware processors; and a memory communicatively coupled to the one or more hardware processors, wherein the memory stores instructions, which, when executed, cause the one or more hardware processors to identify at least one expected relation class associated with at least one expected relation data; assimilate the at least one expected relation data and the at least one identified expected relation class; populate at least one expected name entity data from the at least one identified expected relation class; generate training data by tagging the at least one expected relation data and the at least one identified expected relation class with unstructured or semi-structured data; generate feedback data for a relation data and relation class, using a convergence technique on the tagged training data; retune a NE classifier cluster and a relation classifier cluster based on the feedback data by continuously tagging new training data or generating new cascaded expression for a deterministic classifier and a statistical classifier; and complete extraction of the structured data when the NE classifier cluster and the relation classifier cluster converges through the retuning.

In another embodiment, a hardware processor-implemented method for data extraction is disclosed, comprising: identifying, via one or more hardware processors, at least one expected relation class associated with at least one expected relation data; assimilating, via the one or more hardware processors, the at least one expected relation data and the at least one identified expected relation class; populating, via the one or more hardware processors, at least one expected name entity data from the at least one identified expected relation class; generating, via the one or more hardware processors, training data by tagging the at least one expected relation data and the at least one identified expected relation class with unstructured or semi-structured data; generating, via the one or more hardware processors, feedback data for a relation data and relation class, using a convergence technique on the tagged training data; retuning, via the one or more hardware processors, a NE classifier cluster and a relation classifier cluster based on the feedback data by continuously tagging new training data or generating new cascaded expression for a deterministic classifier and a statistical classifier; and completing extraction, via the one or more hardware processors, of the structured data when the NE classifier cluster and the relation classifier cluster converges through the retuning.

In yet another embodiment, a non-transitory, computer-readable medium storing data extraction instructions that, when executed by a hardware processor, cause the hardware processor to: identify at least one expected relation class associated with at least one expected relation data; assimilate the at least one expected relation data and the at least one identified expected relation class; populate at least one expected name entity data from the at least one identified expected relation class; generate training data by tagging the at least one expected relation data and the at least one identified expected relation class with unstructured or semi-structured data; generate feedback data for a relation data and relation class, using a convergence technique on the tagged training data; retune a NE classifier cluster and a relation classifier cluster based on the feedback data by continuously tagging new training data or generating new cascaded expression for a deterministic classifier and a statistical classifier; and complete extraction of the structured data when the NE classifier cluster and the relation classifier cluster converges through the retuning.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

FIG. illustrates exemplary aspects of an information extraction system 100 according to some embodiments of the present disclosure. Some embodiments of information extraction system 100 may be configured to convert unstructured data (e.g., 130) into structured data (e.g., 140) in an automated fashion. For example, data 130 may include large, unstructured, dark data, for example, where the structure of the data, the entities represented in the data, and the relationships between the entities are unknown and potentially ambiguous. Examples of data 130 include plain text, HTML code, web content, PDF file data, metadata, optical character recognition (OCR) generated data, handwritten text, and/or the like. In some embodiments, information extraction system 100 may extracted named entities (e.g., names of persons, organization, etc.) and relationships among those named entities, as explained further below. Accordingly, information extraction system 100 may produce structured data 140, e.g., including named entities and their relationships in a structured manner.

Figure 3:
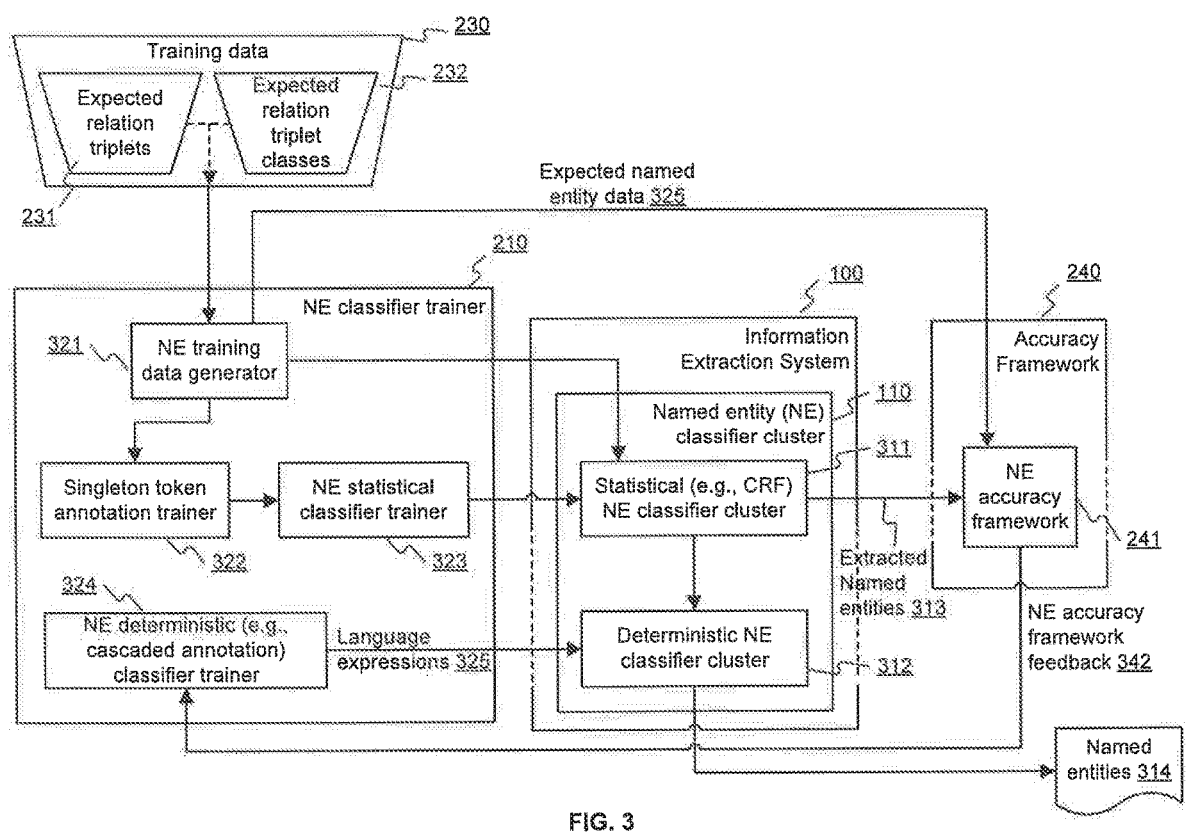
FIG. 3 is a functional block diagram illustrating further exemplary aspects of initial learning system 200 related to training a named entity (NE) classifier cluster 110 of information extraction system 100, in accordance with some embodiments of the present disclosure.

To accomplish this, in some embodiments, information extraction system 100 may include a named entity (NE) classifier cluster 110 and a relation (RE) classifier cluster 120. For example, NE classifier cluster 110 may be configured to extracted named entities with high precision and recall from the unstructured data 130, and RE classifier cluster 120 may be configured to extract relationships between the extracted named entities with high precision and recall. Example aspects of an embodiment of NE classifier cluster 110 are depicted in FIG. 3, and described further below in the discussion with reference to FIG. 3. Example aspects of an embodiment of RE classifier cluster 120 are depicted in and discussed further below with reference to FIG. 4.

Figure 2:
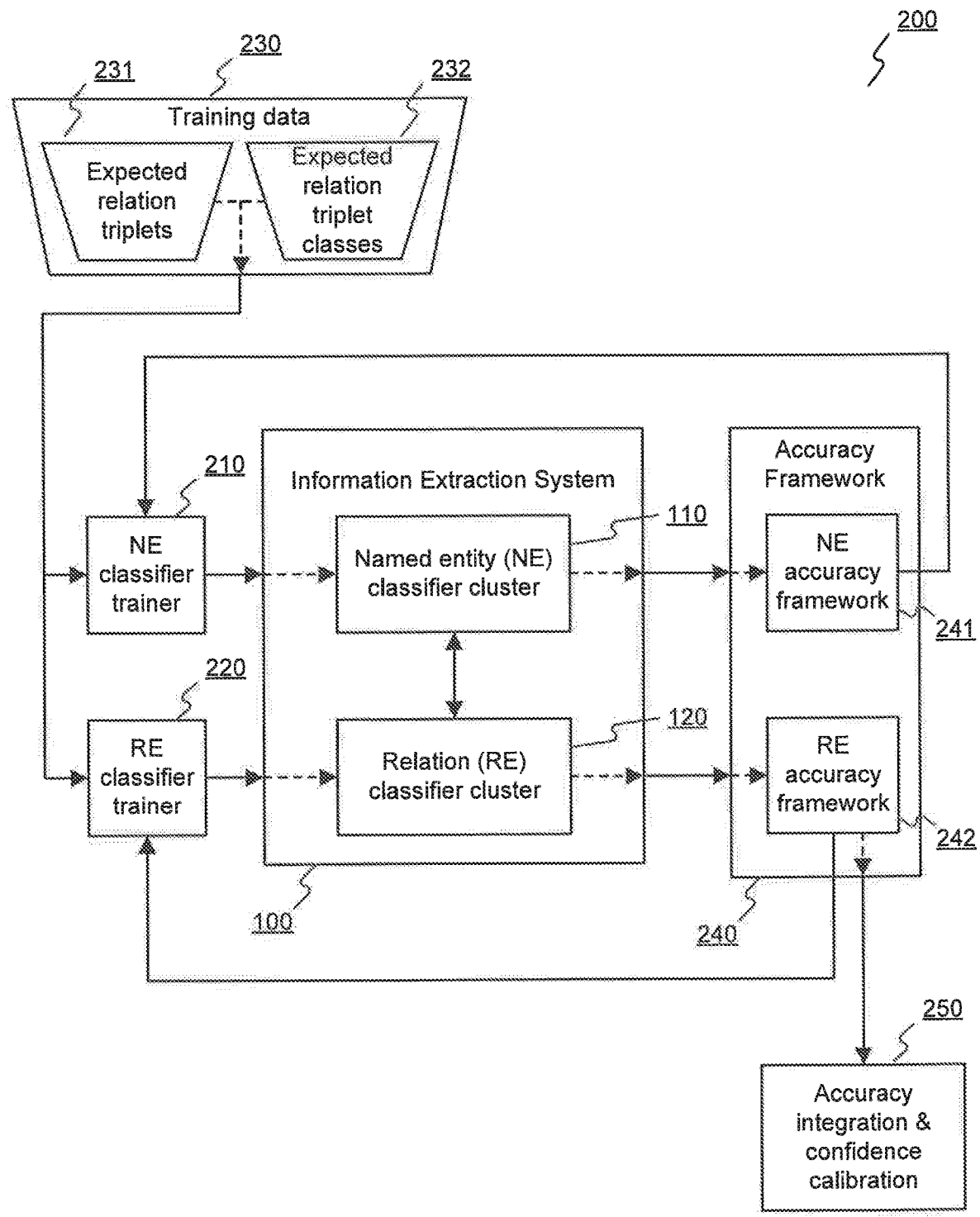
FIG. 2 is a functional block diagram illustrating exemplary aspects of an initial learning system 200 for training information extraction system 100, according to some embodiments of the present disclosure.
Figure 4:
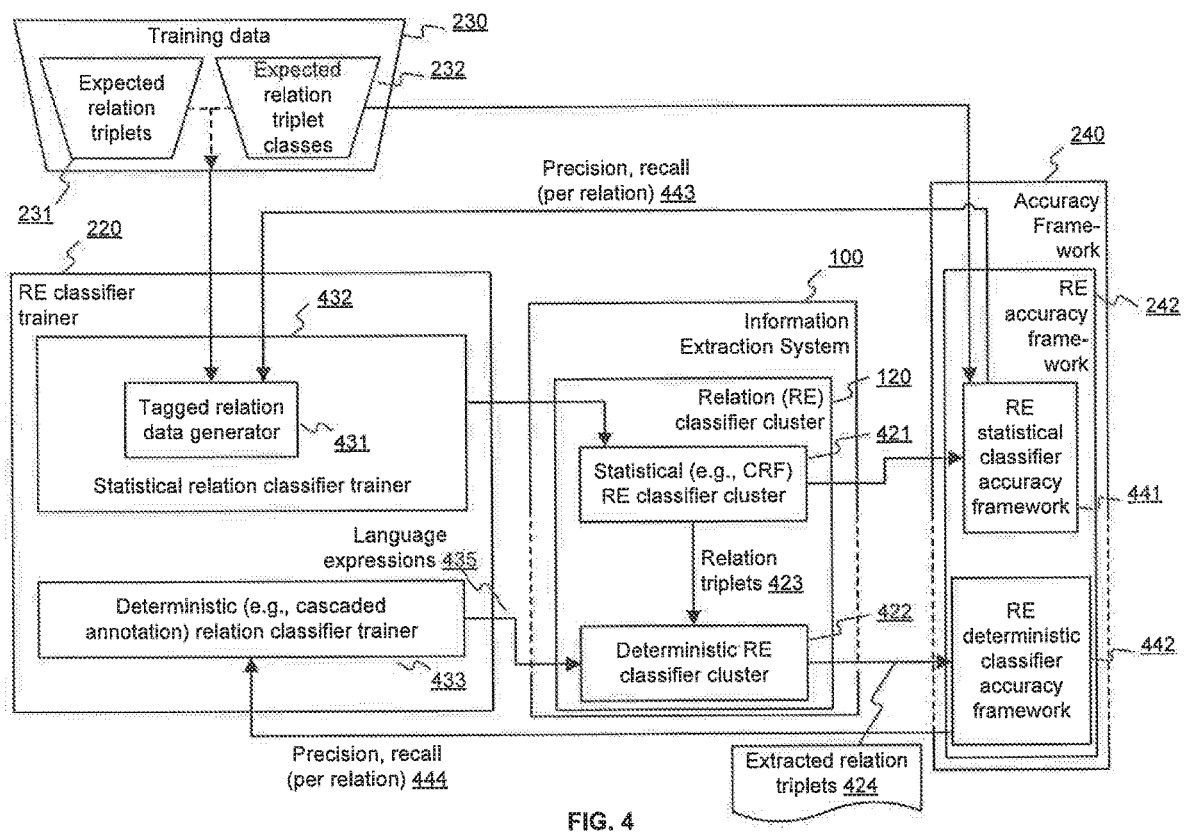
FIG. 4 is a functional block diagram illustrating further exemplary aspects of initial learning system 200 related to training a relation (RE) classifier cluster 120 of information extraction system 100, in accordance with some embodiments of the present disclosure.

FIG. 2 is a functional block diagram illustrating exemplary aspects of an initial learning system 200 for training information extraction system 100, according to some embodiments of the present disclosure. In some embodiments, initial learning system 200 may be used to configure NE classifier cluster 110 of information extraction system 100 to extracted named entities with high precision and recall from the unstructured data 130, and to configure RE classifier cluster 120 of information extraction system 100 to extract relationships between the extracted named entities with high precision and recall. Accordingly, in some embodiments, initial learning system 200 may include a NE classifier trainer 210 for training NE classifier cluster 110 of information extraction system 100, and may include a RE classifier trainer 220 for training RE classifier cluster 120 of information extraction system 100. Example aspects of an embodiment of NE classifier trainer 210 are depicted in FIG. 3, and described further below in the discussion with reference to FIG. 3. Example aspects of an embodiment of RE classifier trainer 220 are depicted in FIG. 4, and described further below in the discussion with reference to FIG. 4.

In some embodiments, NE classifier trainer 210 and RE classifier trainer 220 may use training data 230 to generate training and test samples with which to train NE classifier cluster 110 and RE classifier cluster 120 respectively. In some embodiments, training data 230 may include expected relation triplets 231 and expected relation triplet classes 232.

With reference to expected relation triplets 231, consider the sentence, "John Q. Smith is the CEO of ABC Corp." An example of an expected relation triplet related to this sentence may be written as [John Q. Smith, CEO, ABC Corp.], with "John Q. Smith," "CEO," and "ABC Corp." forming the three elements of the expected relation triplet. In some embodiments, expected relation triplets 231 may generally be represented in the form [Subject, Predicate, Object]. For example, the relation triplet [John Q. Smith, CEO, ABC Corp.] identifies two named entities—"John Q. Smith" and "ABC Corp."—and one relation between them—"CEO." Further, the relation triplet identifies the named entity, "John Q. Smith," as the subject, and identifies the named entity, "ABC Corp.," as the object. It further identifies the relation "CEO" as the predicate tying the named entity, "John Q. Smith" to the other named entity "ABC Corp." A sentence may include a large number of named entities, and may present a large number of relations between the various named entities. Accordingly, a single sentence may correspond to just one, or to a large number, of relation triplets.

With reference to expected relation triplet classes 232, continuing with the example sentence above, each of the elements in the expected relation triplet may be assigned a class. For example, "John Q. Smith" may belong to a class PERSON, "CEO" may belong to a class DESIGNATION (or DESG), and "ABC Corp." may belong to a class ORGANIZATION (or ORG). The expected relation triplet classes 232 within training data 230 may include such classifications corresponding to the expected relation triplets 231.

In some embodiments, NE classifier trainer 210 and RE classifier trainer 220 may use expected relation triplets 231 and expected relation triplet classes 232 to generate unstructured data with which to train NE classifier cluster 110 and RE classifier cluster 120 respectively. An accuracy framework 240 may obtain the results produced by the NE classifier cluster 110 and RE classifier cluster 120 operating on the generated unstructured data, and compare those results to the known expected relation triplets 231 and expected relation triplet classes 232 from training data 230. Based on the comparison, the accuracy framework 240 may provide accuracy framework feedback to the NE classifier trainer 210 and RE classifier trainer 220. Using the accuracy framework feedback, the NE classifier trainer 210 and RE classifier trainer 220 may retune the NE classifier cluster 110 and RE classifier cluster 120 respectively, and iteratively repeat such training procedure using additional unstructured data generated using expected relation triplets 231 and expected relation triplet classes 232.

Specifically, in some embodiments, NE classifier trainer 210 may tune NE classifier cluster 110, and may provide unstructured data, generated using expected relation triplets 231 and expected relation triplet classes 232, for NE classifier cluster 110 to operate on. NE classifier cluster 110 may provide named entities that it extracts to NE accuracy framework 241 included in accuracy framework 240. NE accuracy framework 241 may compare the extracted named entities provided by NE classifier cluster 110 to expected name entities provided to it by NE classifier trainer 210, and determine whether the NE classifier cluster 110 has achieved convergence, e.g., whether the precision and recall associated with the NE classifier cluster 110 are above predetermined threshold values, per each named entity class. If the NE classifier cluster 110 has not achieved convergence, NE accuracy framework 241 may provide NE accuracy framework feedback to NE classifier trainer 210. NE classifier trainer 210 may use the NE accuracy framework feedback to retune NE classifier cluster 110, and repeat the above training sequence until the NE classifier cluster 110 achieves convergence. Further example aspects of such procedure are provided below in the discussion with reference to FIG. 3.

Further, in some embodiments, RE classifier trainer 220 may tune RE classifier cluster 120. Then, RE classifier cluster 120 may operate on the named entities extracted by the converged NE classifier cluster 110, as well as the previously unstructured data generated using expected relation triplets 231 and expected relation triplet classes 232, to extract relation triplets and extracted relation triplet classes corresponding to the named entities extracted by the converged NE classifier cluster 110. RE classifier cluster 120 may provide these to RE accuracy framework 242 included in accuracy framework 240. RE accuracy framework 242 may also receive tagged relation data from RE classifier trainer 220, and compare the tagged relation data to the extract relation triplets and extracted relation triplet classes from RE classifier cluster 120 to determine whether the RE classifier cluster 120 has achieved convergence, e.g., whether the precision and recall associated with the RE classifier cluster 120 are above predetermined threshold values, per each relation predicate. If the RE classifier cluster 120 has not achieved convergence, RE accuracy framework 242 may provide RE accuracy framework feedback to RE classifier trainer 220. RE classifier trainer 220 may use the RE accuracy framework feedback to retune RE classifier cluster 120, and repeat the above training sequence until the RE classifier cluster 120 achieves convergence. Further example aspects of such procedure are provided below in the discussion with reference to FIG. 4.

Figure 1:
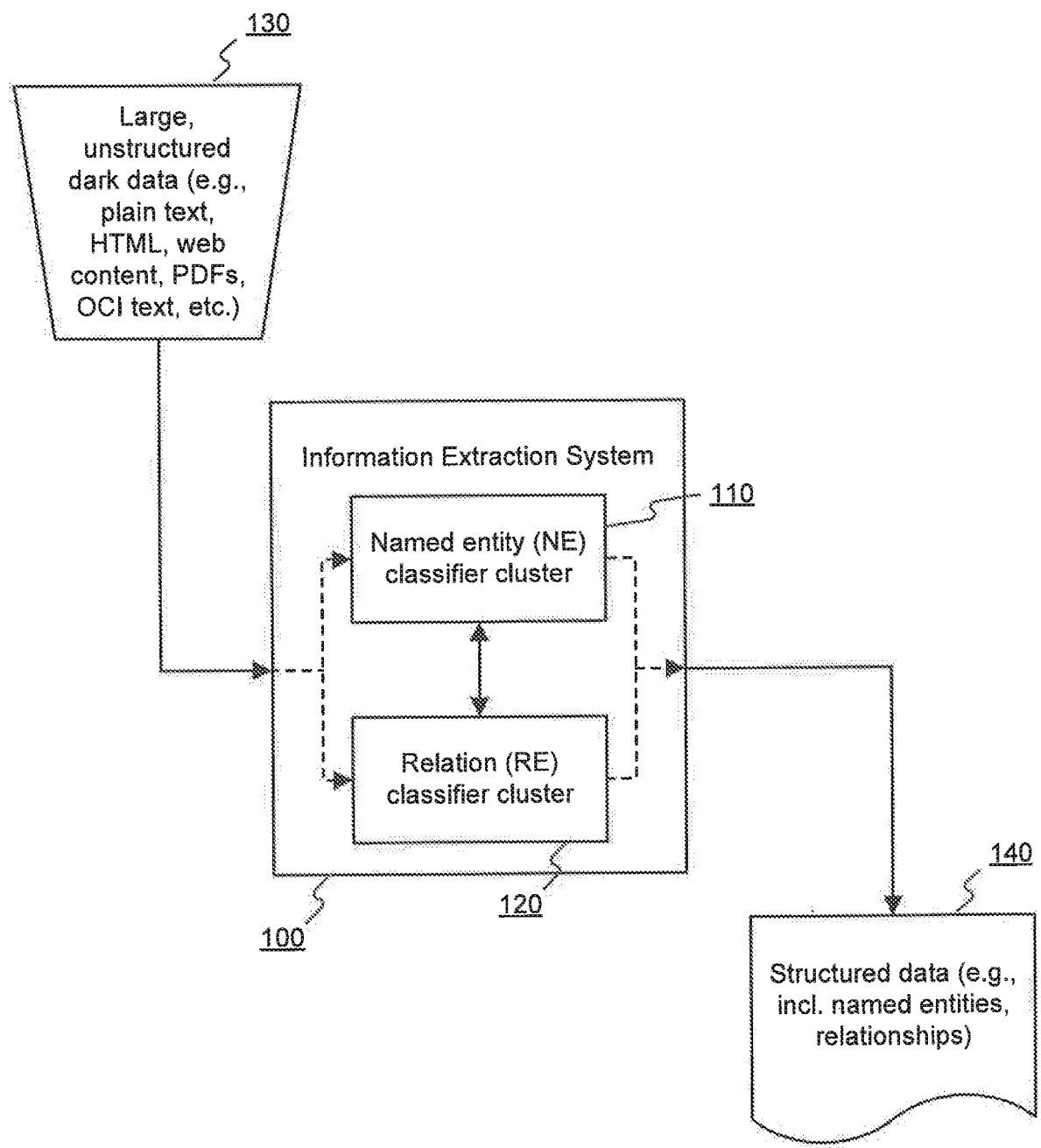
FIG. 1 illustrates exemplary aspects of an information extraction system 100 according to some embodiments of the present disclosure.

In some embodiments, once RE classifier cluster 120 achieves convergence, RE accuracy framework 242 may provide precision and recall scores, among other information, to accuracy integration and confidence calibration system 250. Accuracy integration and confidence calibration system 250 may, during regular operation of information extraction system 100, e.g., in accordance with FIG. 1, be used to provide accuracy and confidence information regarding results produced by information extraction system 100.

FIG. 3 is a functional block diagram illustrating further exemplary aspects of initial learning system 200 related to training a named entity (NE) classifier cluster 110 of information extraction system 100, in accordance with some embodiments of the present disclosure. In some embodiments, NE classifier cluster 110 of information extraction system 100 may include a statistical NE classifier cluster 311 and a deterministic NE classifier cluster 312. NE classifier cluster 110 may accomplish its named entities extraction tasks by the statistical NE classifier cluster 311 and the deterministic NE classifier cluster 312 working in combination with each other.

In some embodiments, the statistical (sometimes called probabilistic) NE classifier cluster 311 may be based on conditional relation fields (CRFs). CRF-based classifiers are well understood by persons of ordinary skill in the art. The statistical NE classifier cluster 311 may produce extracted named entities 313, which it can provide to deterministic NE classifier cluster 312 and/or NE accuracy framework 241.

In some embodiments, the deterministic NE classifier cluster 312 may be a cascaded expression classifier. Examples of such classifiers are included in A. X. Chang and C. D. Manning, *TokensRegex: Defining cascaded regular expressions over tokens*, Technical Report CSTR 2014-02, Department of Computer Science, Stanford University (2014), which is incorporated herein by reference in its entirety for all purposes. In some embodiments, the deterministic NE classifier cluster 312 may also operate as a regular expression classifier. In some embodiments, deterministic NE classifier cluster 312 may obtain extracted named entities 313 produced by the statistical NE classifier cluster 311, and operate on them to produce named entities 314. In some embodiments, once NE classifier cluster 110 has achieved convergence, named entities 314 may be considered as the output of the NE classifier cluster 110.

With reference to FIG. 3, additional aspects of NE classifier trainer 210 according to some embodiments are depicted. Specifically, in some embodiments, NE classifier trainer 210 may include a NE training data generator 321, singleton token annotation trainer 322, NE statistical classifier trainer 323, and NE deterministic classifier trainer 324. In some embodiments, singleton token annotation trainer 322 and NE statistical classifier trainer 323 may be configured for training statistical NE classifier cluster 311, whereas NE deterministic classifier trainer 324 may be configured for training deterministic NE classifier cluster 312, as described further below.

In some embodiments, NE training data generator 321 may accept expected relation triplets 231 and expected relation triplet classes 232 as input. NE training data generator 321 may generate tokens T (e.g., T={"John Q. Smith," "CEO," "ABC Corp."}) from the expected relation triplets 231. Further, NE training data generator 321 may generate named entity classes $C_{NE}=\{C_1, C_2, \ldots C_n\}$ (e.g., $C_{NE}=\{DESG, PERSON, ORG, \ldots\}$) from expected relation triplet classes 232. Using the generated tokens and named entity classes, NE training data generator 321 may generate token-class tuples $CT_{NE}=\{token, C_{NE}\}$ (e.g., $CT_{NE}=\{(CEO, DESG), (CFO, DESG), (CMO, DESG), (Barry D. Bray, PERSON), (Regional President of ABC Corp., LLC, DESG) \ldots\}$), and generate unstructured data (e.g., freeform text) using the token-class tuples. In some embodiments, a portion of the sentence, e.g., 90% of the whole unstructured data set, may be used for training the system, and, e.g., 10%, may be used for testing. In such situations, the training set may be denoted as $S_{Training}$, and the test set may be represented as $S_{Test}$. In alternate embodiments, the whole unstructured data set may be denoted as $S_{Training}$ and used for training the system. The NE training data generator 321 may tag the training sets $S_{Training}$ and/or $S_{Test}$ with the generated token-class tuples $CT_{NE}$, and pass the tagged data to singleton token annotation trainer 322.

In some embodiments, singleton token annotation trainer 322 may accept the training set $S_{Training}$ as input, and first operate on the unstructured data included in the $S_{Training}$ set. The singleton token annotation trainer 322 may process the unstructured data included in the $S_{Training}$ set according to a standard pipeline, e.g., [tokenize, ssplit, pos, lemma, parse, ner], using standard classifiers, for example available via the Stanford CoreNLP software package known to persons of ordinary skill in the art. However, the singleton token annotation trainer 322 may override the named entity tagging created by this processing, replacing the tagging instead with the tagging from the token-class tuples $CT_{NE}$ generated by NE training data generator 321. Accordingly, the singleton token annotation trainer 322 may regenerate custom tokens and custom class pairs in the data set.

In some embodiments, statistical NE classifier cluster 311 may initially obtain the training set $S_{Training}$ as input, and statistical NE classifier cluster 311 may extract named entities 313 from the training set $S_{Training}$. The extracted named entities 313 may be provided by statistical NE classifier cluster 311 to NE accuracy framework 241. NE accuracy framework 241 may determine accuracy of the extracted named entities and named entity classes, and produce NE accuracy framework feedback 342. In some embodiments, NE accuracy framework feedback 342 may take the form:

($C_{NE}{}^i$ -> Precision, Recall, F-Score),
    where $C_{NE}{}^i$ is $i^{th}$ NE class among the understood classes $C_{NE}$
($C_{NE}{}^i$ -> {MisclassifiedTokens})

In some embodiments, the F-Score may be a harmonic mean of the precision and recall, e.g., (2*Precision*Recall)/(Precision+Recall).

In some embodiments, NE accuracy framework 241 may determine whether the accuracy of the extracted named entities and named entity classes is sufficiently high that convergence has been achieved, such that the initial learning process for the NE classifier cluster 110 has been completed. For example, NE accuracy framework 241 may use a composite F-score generated from the F-scores per named entity class, and determine whether the composite F-score exceeds a minimum threshold score. If the minimum threshold score is exceeded, then NE accuracy framework 241 may determine that convergence has been achieved; otherwise, NE accuracy framework 241 may determine that convergence has not been achieved, The example pseudocode provided below illustrates such a convergence determination procedure:

```
While curIter < MaxIter
    AnnotateNETrainer
    Annotate(NEMissclassification)
    Wait for feedback from CRF Accuracy Framework
    Calculate Current-NE-F-Score_TaggedTrainingSet = (ΣC_F-Score/C_n)
    IF (Current-NE-F-Score_TaggedTrainingSet > NE-F-Score-Thresold)
        NE-F-Score-Thresold = Current-NE-F-Score_TaggedTrainingSet
        DONE
    End IF
End While Loop
```

If NE classifier cluster 110 has achieved convergence, named entities 314 may be considered as the output of the NE classifier cluster 110. If NE classifier cluster 110 has not achieved convergence, NE accuracy framework 241 may provide NE accuracy framework feedback 342 to NE classifier trainer 210 to continue the iterative initial learning process for the NE classifier cluster 110, until either convergence has been achieved or a maximum limit for the number of iterations has been reached.

In some embodiments, the NE classifier trainer 210 may obtain the NE accuracy framework feedback 342 from the NE accuracy framework 241. NE classifier trainer 210 may interpret the misclassifications identified in the NE accuracy framework feedback 342, For example, NE classifier trainer 210 may determine from the NE accuracy framework feedback 342 that the statistical NE classifier cluster 311 missed classifications (e.g., certain named entities were not classified under any named entity class), a form of misclassification. Consider, as an example, a multi-token phrase, "independent, non-executive director." Three tokens are involved—"independent," "non-executive," and "director." Suppose that each token should properly be identified as belonging to DESIGNATION (or DESG) named entity class, since "independent, non-executive, director" indicates a job designation. As an example, the statistical NE classifier cluster 311 may correctly identify that "director" belong to the DESG named entity class, but may fail to identify that "independent" and "non-executive" also belong to the DESG named entity class, and assign an OTHER (or MISC) designation to these tokens. In such an example, the statistical NE classifier cluster 311 has performed a multi-token misclassification.

As another example, NE classifier trainer 210 may determine from the NE accuracy framework feedback 342 that the statistical NE classifier cluster 311 performed misclassifications (e.g., a named entity is classified under a different named entity class than its expected named entity class). Consider, as an illustration, a multi-token phrase, "London Chairman," meant to refer to a designation, e.g., "Richard served as London Chairman at ABC Corp." As an example, the statistical NE classifier cluster 311 may incorrectly identify that "London" belongs to the LOCATION named entity class, as opposed to the correct DESG named entity class. In such an example, the statistical NE classifier cluster 311 has performed a single-token misclassification.

In some embodiments, NE accuracy framework feedback 342 from the NE accuracy framework 241 may include information on the missed classifications and misclassifications performed by statistical NE classifier cluster 311, which may be provided to singleton token annotation trainer 322 and/or NE deterministic classifier trainer 324.

For example, tokens implicated in single-token misclassification by statistical NE classifier cluster 311, and which were tupled with a custom class by singleton token annotation trainer 322 as described above, may be added (e.g., as part of a token-class tuple) to a single-token training set $ST_{MC}$, for further processing. By contrast, tokens implicated in single-token misclassification by statistical NE classifier cluster 311, and which were not tupled with a custom class by singleton token annotation trainer 322, may be added (e.g., as part of a token-class tuple) to a cascaded-expression, single-token, training set $CST_{MC}$ by NE classifier trainer 210, and provided to NE deterministic classifier trainer 324 for further processing as described below. In some embodiments, the training set $CST_{MC}$ may not only contain single tokens implicated in misclassification, as described above, but also the surrounding tokens that were part of the same sentence in the unstructured data from which the tokens implicated in the single-token misclassification came.

Continuing the example, from the tokens included in the single-token training set $ST_{MC}$, those tokens which were part of the token-class tuples $CT_{NE}$ generated by the NE training data generator 321 in a previous iteration, may be added (e.g., as part of a token-class tuple) to a regular-expression, single-token, training set $RST_{MC}$ by NE classifier trainer 210, and provided to NE deterministic classifier trainer 324 for further processing as described below. In some embodiments, the training set $RST_{MC}$ may not only contain single tokens implicated in misclassification, as described above, but also the surrounding tokens that were part of the same sentence in the unstructured data from which the tokens implicated in the single-token misclassification came.

Further, from the tokens included in the single-token training set $ST_{MC}$, those tokens which were not part of the token-class tuples $CT_{NE}$ generated by the NE training data generator 321 in a previous iteration, may be added (as part of a token-class tuple) to a training set $NST_{MC}$ by NE classifier trainer 210, and provided to singleton token annotation trainer 322, which may add the training set $NST_{MC}$ to the token-class tuples $CT_{NE}$ from NE training data generator 321 in a next iteration of the training procedure by singleton token annotation trainer 322, NE statistical classifier trainer 323, statistical NE classifier cluster 311, and NE accuracy framework 241, as described above. In some embodiments, the NE accuracy framework feedback 342 generated by this next iteration may be used to further populate the various training sets provided by the NE classifier trainer 210 to NE deterministic classifier trainer 324 for further processing. In some embodiments, tokens that after one or more such iterations would ordinarily continue to be added to the training set $NST_{MC}$ may instead be added (e.g., as part of a token-class tuple) to the regular-expression, single-token, training set $RST_{MC}$ by NE classifier trainer 210, and provided to NE deterministic classifier trainer 324 for further processing as described below. For example, once the iterative processing of the NE accuracy framework feedback 342 from the NE accuracy framework 241 has been completed as described above, the single-token training sets $CST_{MC}$ and $RST_{MC}$ generated by NE classifier trainer 210 may be provided to the NE deterministic classifier trainer 324 for further processing as described below.

As another example, tokens implicated in multi-token misclassification by statistical NE classifier cluster 311, and which are not present in token-class tuples $CT_{NE}$ generated by the NE training data generator 321 or the single-token training sets $CST_{MC}$ and $RST_{MC}$ generated by NE classifier trainer 210, may be added (e.g., as part of token-class tuples) to the training set $NST_{MC}$ by NE classifier trainer 210, and may be processed according to the iterative procedure described above to generate the single-token training sets $CST_{MC}$ and $RST_{MC}$ provided to the NE deterministic classifier trainer 324 for further processing.

In some embodiments, NE deterministic classifier trainer 324 may generate regular language expressions (see FIG. 3, 325) corresponding to each token in the $RST_{MC}$ training set, and provide the regular language expressions to deterministic NE classifier cluster 312 to facilitate its operation. The example below illustrates a syntax for a regular expression that forces the token sequence "board of directors" (case insensitive) to be assigned to the named entity class ELECTEDBODY:

((B|b)(O|o)(A|a)(R|r)(D|d)) ((o|O)(f|F))
((D|d)(I|i)(R|r)(e|E)(c|C)(t|T)(o|O)(r|R)(S|s)?)
ELECTEDBODY

The NE deterministic classifier trainer 324 may accomplish this by obtaining a token and its expected named entity class, and generating a regular language expression similar to that illustrated by the example above.

In some embodiments, NE deterministic classifier trainer 324 may generate cascaded language expressions (see FIG. 3, 325) corresponding to the tokens in the $CST_{MC}$ training set, and provide the regular language expressions to deterministic NE classifier cluster 312 to facilitate its operation. For example, the NE deterministic classifier trainer 324 may obtained tokens involved in a multi-token misclassification, and may sort the tokens in an order of priority (e.g., first words, then entities, and finally parts of speech), and generate the cascaded language expression accordingly. As an illustration, consider a situation in which the token sequence "chief executive officer" were misclassified as {OTHER DESG DESG} instead of a single designation for the sequence, "DESG" (chief executive officer being a single job designation). NE deterministic classifier trainer 324 may order the token as "chief"->"executive"->"officer," and then generate a cascaded language expression as shown below:

```
{
    pattern: ( ( [ { word: chief } ] { ner:DESG } ] + ) ),
    action: ( Annotate ($0, ner, "DESG") ),
    stage: 13
}
```

The above example cascaded language expression instructs the deterministic NE classifier cluster 312 that if it comes across a token sequence pattern starting with the token "chief" having the named entity class "DESG," then it should also annotate the following tokens in the token sequence with the named entity class "DESG."

FIG. 4 is a functional block diagram illustrating further exemplary aspects of initial learning system 200 related to training a relation (RE) classifier cluster 120 of information extraction system 100, in accordance with some embodiments of the present disclosure. In some embodiments, RE classifier cluster 120 of information extraction system 100 may include a statistical RE classifier cluster 421 and a deterministic RE classifier cluster 422. RE classifier cluster 120 may accomplish its task of extracting relation triplets by the statistical RE classifier cluster 421 and the deterministic RE classifier cluster 422 working in combination with each other.

In some embodiments, the statistical (sometimes called probabilistic) RE classifier cluster 421 may be based on conditional relation fields (CRFs). CRF-based classifiers are well understood by persons of ordinary skill in the art. The statistical RE classifier cluster 421 may produce relation triplets 423, which it can provide to deterministic RE classifier cluster 422 and/or RE accuracy framework 242.

In some embodiments, the deterministic RE classifier cluster 422 may be a cascaded expression classifier. Examples of such classifiers are included in A. X. Chang and C. D. Manning, *TokensRegex: Defining cascaded regular expressions over tokens*, Technical Report CSTR 2014-02, Department of Computer Science, Stanford University (2014), which is incorporated herein by reference in its entirety for all purposes. In some embodiments, the deterministic RE classifier cluster 422 may also operate as a regular expression classifier. In some embodiments, deterministic RE classifier cluster 422 may obtain relation triplets 423 produced by the statistical RE classifier cluster 421, and operate on them to generate extracted relation triplets 424. In some embodiments, once RE classifier cluster 120 has achieved convergence, extracted relation triplets 424 may be considered as the output of the RE classifier cluster 120.

With reference to FIG. 4, additional aspects of RE classifier trainer 220 according to some embodiments are depicted. Specifically, in some embodiments, RE classifier trainer 220 may include a statistical relation classifier trainer 432 comprising a tagged relation data generator 431, and a deterministic relation classifier trainer 433. In some embodiments, statistical relation classifier trainer 432, including, in some embodiments, tagged relation data generator 431, may be configured for training statistical RE classifier cluster 421, whereas deterministic relation classifier trainer 433 may be configured for training deterministic RE classifier cluster 422, as described further below.

In some embodiments, statistical relation classifier trainer 432 may obtain unstructured training data (e.g., generated by NE training data generator 321), named entities 314 (e.g., from named entity classifier cluster 110), as well as expected relation triplets 231 and expected relation triplet classes 232 from training data 230. In some embodiments, tagged relation data generator 431 included within statistical relation classifier trainer 431 may, according to a randomized selection procedure, generate tagged relation data from these data for training statistical RE classifier cluster 421, for example in a CoNLL (Conference on Natural Language Learning) data format. Examples of CoNLL-format data are provided below:

| Named Entity Class | Token # | Part-of-Speech Tag | Token |
|---|---|---|---|
| ELECTEDBODY | 0 | NNP | BOARD |
| O | 1 | IN | OF |
| ORGANIZATION | 2 | NNP/NNP | DIRECTORS/Board |

| Token # | Token # | Named Entity Class | Token # | Part-of-Speech Tag | Token |
|---|---|---|---|---|---|
| 0 | 0 |  | 0 |  |  |
| 0 | 0 | PERSON | 1 | NNP | George |
| 0 | 0 | O | 2 | VBD | was |
| 0 | 0 | O | 3 | VBN | appointed |
| 0 | 0 | O | 4 | TO | to |
| 0 | 0 | O | 5 | DT | the |
| 0 | 0 | ELECTEDBODY | 6 | NN | board |
| 0 | 0 | O | 7 | IN | in |
| 0 | 0 | DATE | 8 | CD | 1999 |
| 0 | 0 | O | 9 | CC | and |
| 0 | 0 | O | 10 | VBD | took |
| 0 | 0 | O | 11 | RP | up |
| 0 | 0 | O | 12 | PRP$ | his |
| 0 | 0 | O | 13 | JJ | current |
| 0 | 0 | O | 14 | NN | appointment |
| 0 | 0 | O | 15 | IN | as |
| 0 | 0 | DESG | 16 | NNP/NNP | Chief/Executive |
| 0 | 0 | O | 17 | IN | in |
| 0 | 0 | DATE | 18 | NNP/CD | April/2005 |
| 0 | 0 | O |  |  |  |
| 1 | 16 | cur_desg |  |  |  |
| 16 | 18 | appointed_date |  |  |  |

Further, in the above example, the part-of-speech tags may be understood as tabulated below:

| Part-of-Speech Tag | Description |
|---|---|
| CC | Coordinating conjunction |
| CD | Cardinal number |
| DT | Determiner |
| EX | Existential there |
| FW | Foreign word |
| IN | Preposition or subordinating conjunction |
| JJ | Adjective |
| JJR | Adjective, comparative |
| JJS | Adjective, superlative |
| LS | List item marker |
| MD | Modal |
| NN | Noun, singular or mass |
| NNS | Noun, plural |
| NNP | Proper noun, singular |
| NNPS | Proper noun, plural |
| PDT | Predeterminer |

-continued

| Part-of-Speech Tag | Description |
|---|---|
| POS | Possessive ending |
| PRP | Personal pronoun |
| PRP$ | Possessive pronoun |
| RB | Adverb |
| RBR | Adverb, comparative |
| RBS | Adverb, superlative |
| RP | Particle |
| SYM | Symbol |
| TO | to |
| UH | Interjection |
| VB | Verb, base form |
| VBD | Verb, past tense |
| VBG | Verb, gerund or present participle |
| VBN | Verb, pas participle |
| VBP | Verb, non-3rd person singular present |
| VBZ | Verb, 3rd person singular present |
| WDT | Wh-determiner |
| WP | Wh-pronoun |
| WP$ | Possessive wh-pronoun |
| WRB | Wh-adverb |

In some embodiments, tagged relation data generator 431 may bias its randomized selection procedure using precision and recall score feedback (per relation) 443 from RE statistical classifier accuracy framework 441. For example, tagged relation data generator 431 may bias its randomized selection in favor of certain expected relation triplet classes 232 based on the received precision, recall scores, and/or F-scores. In some embodiments, the F-Score may be calculated as a harmonic mean of the precision and recall, e.g., (2*Precision*Recall)/(Precision+Recall). The tagged relation data generator 431 may pass the tagged relation data to statistical RE classifier cluster 421 for training. In some embodiments, tagged relation data generator 431 may iteratively produce tagged relation data until either convergence has been achieved by statistical RE classifier cluster 421, or a maximum limit for the number of iterations has been reached. If the maximum limit for the number of iterations has been reached, the tagged relation data generator 431 may produce as its output the automated training data set that maximizes the precision, recall, and/or F-scores for all classes:

Maximization objective $\text{argmax}_{TaggedTrainingSet} = \max(\Sigma \text{ RC}_{F\text{-}score}/\text{RC}_n)$ $\text{RC}_n$=number of RC classes The example pseudo-code below illustrates operation of tagged relation data generator 431:

```
While curIter < MaxIter
    random-Tagger-Config = TagRandomTrainingData( )
    Generate CRF Classifier
    Wait for feedback from CRF Accuracy Framework
    Calculate Current-F-Score_TaggedTrainingSet = (Σ RC_F-Score/RC_n)
    IF Current-F-Score_TaggedTrainingSet > F-Score-Threshold
        final-set.Put (random-Tagger-Config, (training-data, Current-F-ScoreTaggedTrainingSet) )
    End IF
    sortByF-Score(final-set)
    return final-set.get(0)
End While Loop
```

The above automated tagging of relation training data may greatly reduce human effort for manually tagging the data, in particular because many iterations may be required to arrive at an optimal training set.

In some embodiments, statistical relation classifier trainer 432 may pass the generated tagged relation training data to statistical RE classifier cluster 421 for training, and pass the expected relation triplets 231 to RE statistical classifier accuracy framework 441 for accuracy determination.

In some embodiments, statistical RE classifier cluster 421 may extract relation triplets 423 using the tagged relation training data. The extracted relation triplets 423 may be provided by statistical RE classifier cluster 421 to RE statistical classifier accuracy framework 441. RE statistical classifier accuracy framework 441 may determine accuracy of the extracted relation triplets 423 by comparing it to the expected relation triplets 231, and produce RE statistical classifier accuracy framework feedback per relation (see precision, recall (per relation) 443). In some embodiments, Relation accuracy framework feedback 443 and 444 may take the form:

($C_{RC}^{i}$->Precision, Recall, F-Score), where $C_{RC}^{i}$ is $i^{th}$ relation class; i=1 to $RC_n$ In some embodiments, the F-Score per relation may be a harmonic mean of the precision and recall, e.g., (2*Precision$_{RC}$*Recall$_{RC}$)/(Precision$_{RC}$+Recall$_{RC}$).

In some embodiments, RE statistical classifier accuracy framework 441 may determine whether the accuracy of the extracted relation triplets is sufficiently high that convergence has been achieved, such that the initial learning process for the statistical RE classifier cluster 421 has been completed. For example, RE statistical classifier accuracy framework 441 may use a composite F-score generated from the F-scores per relation class, and determine whether the composite F-score exceeds a minimum threshold score. If the minimum threshold score is exceeded, then RE statistical classifier accuracy framework 441 may determine that convergence has been achieved; otherwise, RE statistical classifier accuracy framework 441 may determine that convergence has not been achieved.

As another example, RE statistical classifier accuracy framework 441 may determine whether the precision, recall, and/or F-score for each relation class exceeds a minimum threshold score. If the minimum threshold score is exceeded for precision, recall, and/or F-score for each relation class, then RE statistical classifier accuracy framework 441 may determine that convergence has been achieved; otherwise, RE statistical classifier accuracy framework 441 may determine that convergence has not been achieved. Accordingly, the iterative process described above may converge and tune the statistical RE classifier cluster 421 with initial learning when all the relation classes have precision and recall scores above their corresponding threshold values.

In some embodiments, the matched sentences for which the highest precision and recall values were obtained may be stored in a matrix $RC_{Matrix}$, where each cell in the matrix may be a 3-tuple: {word, pos, ner}. As example row of cells is provided below:

| WORD | Charles | Sinclair | Chairman |
|---|---|---|---|
| POS | NNP | NNP | NNP |
| NER | PERSON | PERSON | DESG |

$RC_{Matrix}$ may be stored in an associative data structure per relation class (RCA). It is to be understood that for a relation, there may be multiple sentences generated by the statistical RE classifier cluster 421 with optimal precision and recall scores. The RCA data structure, which represents an initial learning of the statistical RE classifier cluster 421, may be provided to deterministic RE classifier cluster 422 for its training.

In some embodiments, the matched sentences represented in RCA may be provided to deterministic relation classifier trainer 433, which may use the RCA to train the deterministic RE classifier cluster 422, e.g., by generating cascaded language expressions (see language expressions 435) $CE_{RC}$. A cascaded language expression for an $i^{th}$ relation class may be denoted as $CE_{RC}^i$, and every expression in the class $CE_{RC}^i$ may be denoted as $CE_{RC}^{i[j]}$. The example pseudocode provided below illustrates a cascaded language expression generation procedure:

```
For RC_i in RC
    For S_i in RC_Matrix^i
        For (row [j] in RC_Matrix^i)
            CE_RC^i[j] = GenerateCascadeExpression ( RC_Matrix^i [j] )
            Insert (CE_RC^i[j] in CE_RC^i)
        End For
    End For
End For
For RC_i in RC
    Optimize ( CE^RC_i )
```

As an example, such a cascaded language expression generation procedure may generate an initial relation cascade expression for a matched sentence as follows:
Sentence:
George Weston
Chief Executive (age 52)
George was appointed to the board in 1999 and took up his current appointment as Chief Executive in April 2005.
Initial relation cascade language expression:

```
{
ruleType: "tokens",
pattern: ( ( [ { ner:PERSON } ]+ ) ( [ { word:/was appointed to the/} ] ) ( [ { ner:ELECTEDBODY} ]+ ) ),
result: Format( "CUR_DESG %s %s %s %s", "##", $$1.text, "##", $$4.text),
stage: 1
}
```

Post-optimization relation cascade language expression:

```
{
ruleType: "tokens",
pattern: ( ( [ { ner:PERSON } ]+ ) ( [ { ner:O } ] + ) ( [ { word:/appointed /} ]) ( [ { ner:O } ] + ) ( [ { ner:ELECTEDBODY} ]+ ) ),
result: Format( "CUR_DESG %s %s %s %s", "##", $$1.text, "##", $$4.text),
stage: 1
}
```

In some embodiments, deterministic relation classifier trainer 433 may provide the generated language expressions 435 to deterministic RE classifier cluster 422, which may operate on the relation triplets 423 obtained from statistical RE classifier cluster 421, to produce extracted relation triplets 424. In some embodiments, deterministic relation classifier trainer 433 may also generate a mapping between the extracted relation class and the cascaded language expression which is used to extracted the relation triplets 424. The deterministic relation classifier trainer 433 may pass the extracted relation triplets 424 to RE deterministic classifier accuracy framework 442, which may compare the extracted relation triplets to the expected relation triplets to provide per-relation precision and recall scores back to deterministic relation classifier trainer 433, for iterative improvement of the generated language expressions 435, similar to the procedure described above for tuning the statistical RE classifier cluster 421.

In some embodiments, RE deterministic classifier accuracy framework 442 may determine whether the accuracy of the extracted relation triplets is sufficiently high that convergence has been achieved, such that the initial learning process for the deterministic RE classifier cluster 422 has been completed. For example, RE deterministic classifier accuracy framework 442 may use a composite F-score generated from the F-scores per relation class, and determine whether the composite F-score exceeds a minimum threshold score. If the minimum threshold score is exceeded, then RE deterministic classifier accuracy framework 442 may determine that convergence has been achieved; otherwise, RE deterministic classifier accuracy framework 442 may determine that convergence has not been achieved.

As another example, RE deterministic classifier accuracy framework 442 may determine whether the precision, recall, and/or F-score for each relation class exceeds a minimum threshold score. If the minimum threshold score is exceeded for precision, recall, and/or F-score for each relation class, then RE deterministic classifier accuracy framework 442 may determine that convergence has been achieved; otherwise, RE deterministic classifier accuracy framework 442 may determine that convergence has not been achieved. Accordingly, the iterative process described above may converge and tune the deterministic RE classifier cluster 422 with initial learning when all the relation classes have precision and recall scores above their corresponding threshold values.

In some embodiments, once RE classifier cluster 120 achieves overall convergence, RE accuracy framework 242 may provide precision and recall scores, among other information, to accuracy integration and confidence calibration system 250. Accuracy integration and confidence calibration system 250 may, during regular operation of information extraction system 100, e.g., in accordance with FIG. 1, be used to provide accuracy and confidence information regarding results produced by information extraction system 100.

Figure 5A:
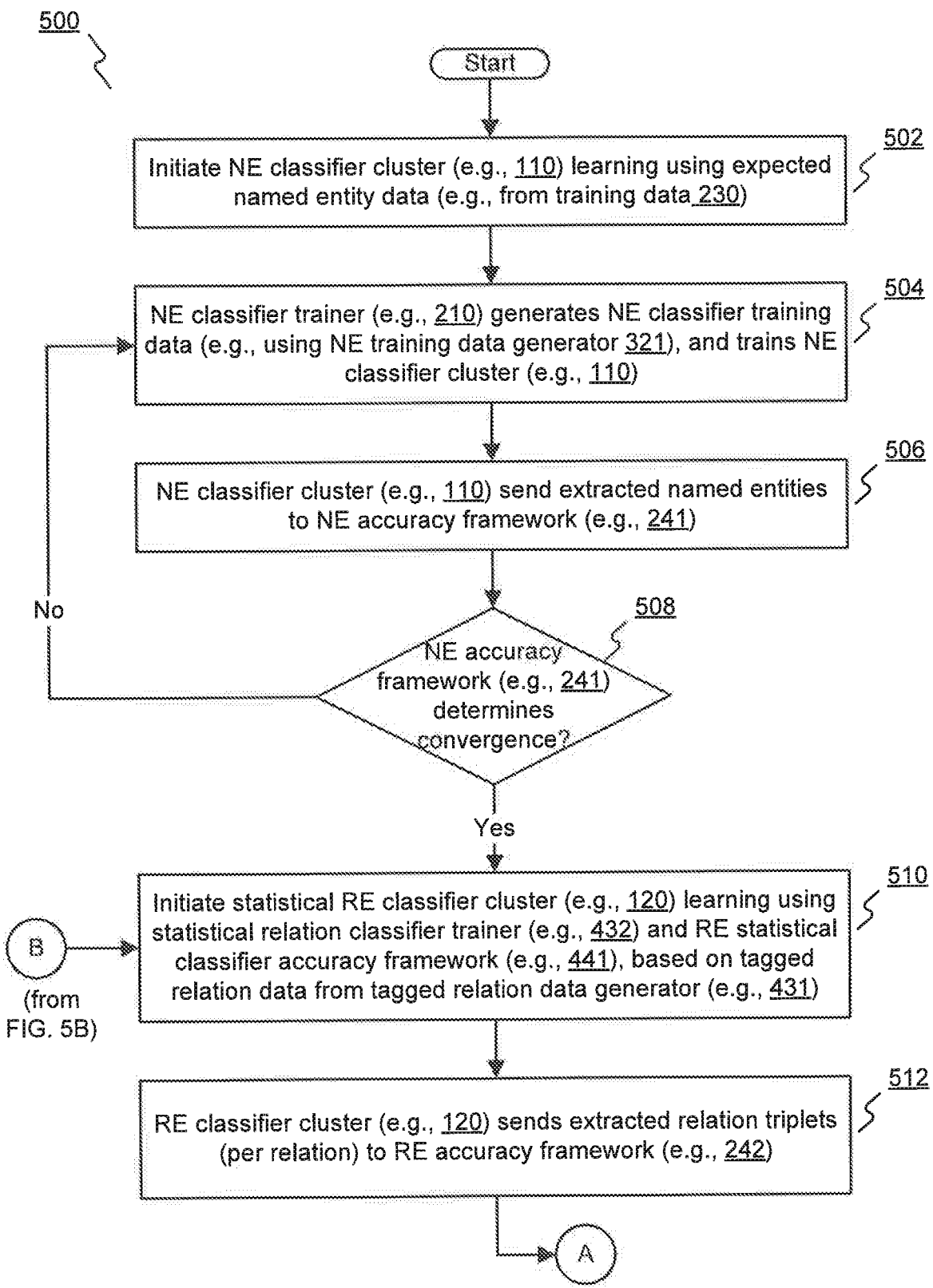
FIGS. 5A-B are flow diagrams illustrating a method of initial learning for training information extraction system 100, in accordance with some embodiments of the present disclosure.
Figure 5B:
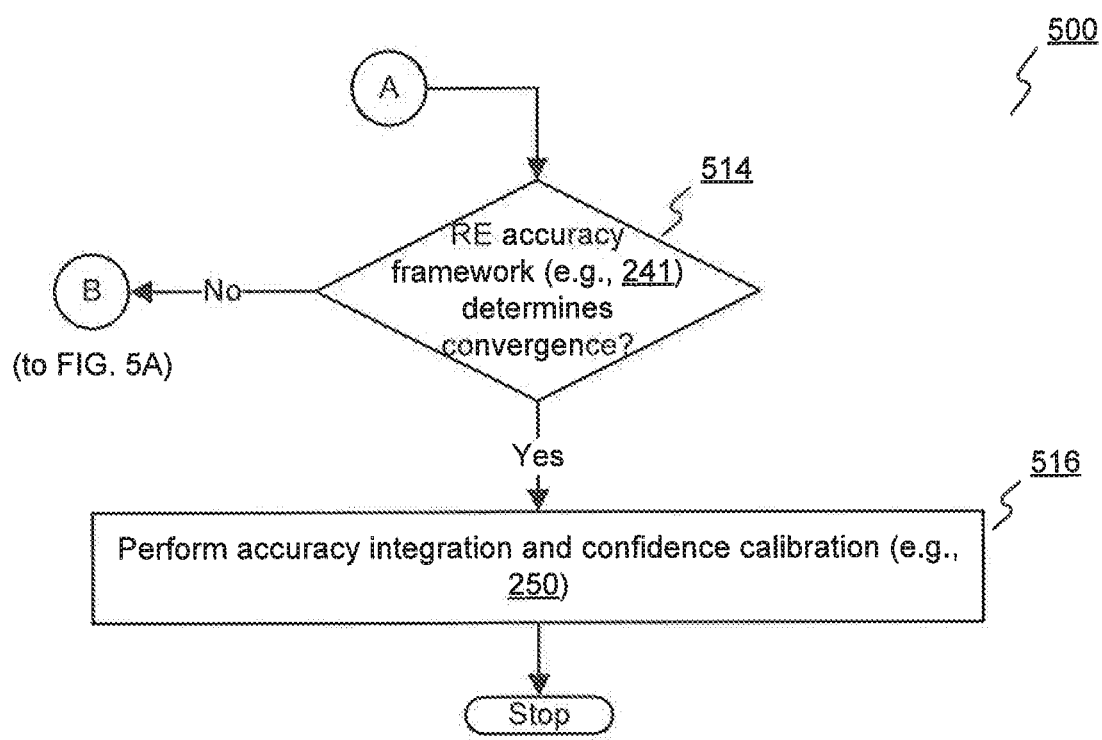

FIGS. 5A-B are flow diagrams illustrating a method of initial learning for training information extraction system 100, in accordance with some embodiments of the present disclosure. With reference to FIG. 5A, in some embodiments, at step 502, initial learning system 200 may initiate NE classifier cluster (e.g., 110) learning using expected named entity data (e.g., from training data 230). At step 504, NE classifier trainer (e.g., 210) may generate NE classifier training data (e.g., using NE training data generator 321), and train NE classifier cluster (e.g., 110), for example as described above in detail with reference to FIG. 3. At step 506, NE classifier cluster (e.g., 110) may send extracted named entities to NE accuracy framework (e.g., 241). At step 508, NE accuracy framework (e.g., 241) may determine whether the NE classifier cluster (e.g., 110) has achieved convergence, for example as described above in detail with reference to FIG. 3. If convergence has not been achieved, the processing may iteratively return to step 504, as described above. If convergence has been achieved, processing may move on to step 510. At step 510, initial learning system 200 may initiate statistical RE classifier cluster (e.g., 120) learning using statistical relation classifier trainer (e.g., 432) and RE statistical classifier accuracy framework (e.g., 441), based on tagged relation data from tagged relation data generator (e.g., 431), for example as described above in detail with reference to FIG. 4. At step

512, RE classifier cluster (e.g., 120) may send extracted relation triplets (per relation) to RE accuracy framework (e.g., 242).

With reference to FIG. 5B, in some embodiments, at step 514, RE accuracy framework (e.g., 242) may determine whether the RE classifier cluster (e.g., 120) has achieved convergence, for example as described above in detail with reference to FIG. 4. If convergence has not been achieved, the processing may iteratively return to step 504, as described above. If convergence has been achieved, processing may move on to step 516. At step 516, RE accuracy framework (e.g., 242) may send precision, recall, and/or F-scores to accuracy integration and confidence calibration (e.g., 250). Accuracy integration and confidence calibration system 250 may, during regular operation of information extraction system 100, e.g., in accordance with FIG. 1, be used to provide accuracy and confidence information regarding results produced by information extraction system 100.

Computer System

Figure 6:
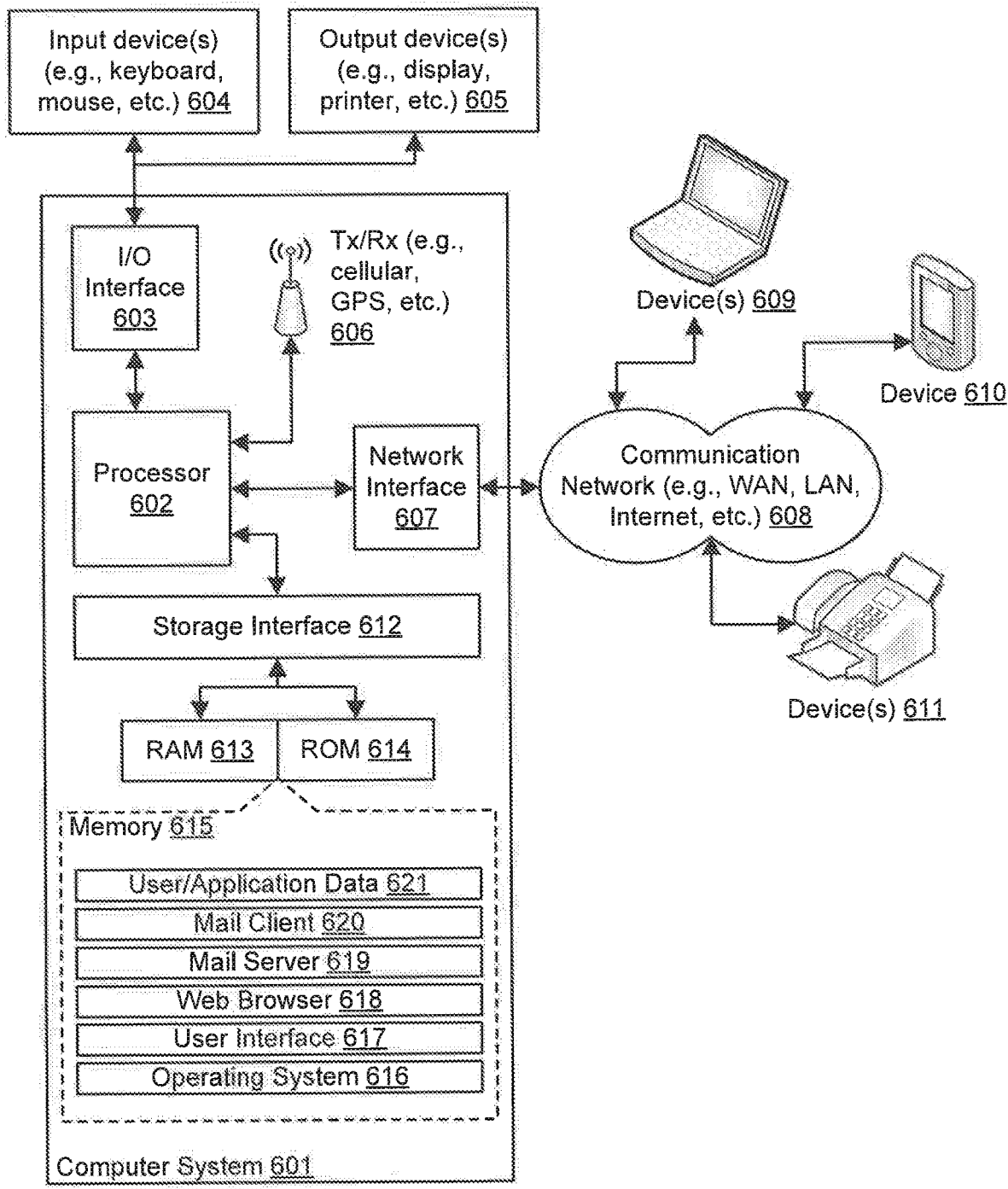
FIG. 6 is a block diagram of an exemplary computer system for implementing embodiments consistent with the present disclosure.

FIG. 6 is a block diagram of an exemplary computer system for implementing embodiments consistent with the present disclosure. Variations of computer system 601 may be used for implementing the devices and systems disclosed herein. Computer system 601 may comprise a central processing unit ("CPU" or "processor") 602. Processor 602 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 610, 611, and 612. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such a cursors, icons, check boxes, menus, strollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for initial learning of an adaptive deterministic classifier for data extraction. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processing system for data extraction, comprising:
one or more hardware processors;
a memory communicatively coupled to the one or more hardware processors, wherein the memory stores instructions, which, when executed, cause the one or more hardware processors to:
identify at least one expected relation class associated with at least one expected relation data;
populate at least one expected name entity data from the at least one identified expected relation class;
generate training data by tagging the at least one expected relation data and the at least one identified expected relation class with unstructured or semi-structured data;
generate feedback data for a relation data and relation class, using a convergence technique on the tagged training data, wherein the convergence technique for generating the feedback data for the relation data and the relation class uses at least a conditional random field classifier;
retune a NE classifier cluster and a relation classifier cluster based on the feedback data by continuously tagging new training data or generating new cascaded expression for a deterministic classifier and a statistical classifier; and
complete extraction of the structured data when the NE classifier cluster and the relation classifier cluster undergoes convergence through the retuning, wherein the convergence occurs when a composite F-score exceeds a minimum threshold score.

2. The processing system of claim 1, wherein the identified expected relation class takes as input a triplet of variables comprising a subject, a predicate, and an object.

3. The processing system of claim 1, wherein at least one statistical relation classifier trainer is used to automate generation of the training data.

4. The processing system of claim 1, wherein the conditional random field classifier is trained by automatically tagging the training data.

5. The processing system of claim 1, wherein the convergence is per relation predicate.

6. A hardware processor-implemented method for data extraction, comprising:
- identifying, via one or more hardware processors, at least one expected relation class associated with at least one expected relation data;
- populating, via the one or more hardware processors, at least one expected name entity data from the at least one identified expected relation class;
- generating, via the one or more hardware processors, training data by tagging the at least one expected relation data and the at least one identified expected relation class with unstructured or semi-structured data;
- generating, via the one or more hardware processors, feedback data for a relation data and relation class, using a convergence technique on the tagged training data, wherein the convergence technique for generating the feedback data for the relation data and the relation class uses at least a conditional random field classifier;
- retuning, via the one or more hardware processors, a NE classifier cluster and a relation classifier cluster based on the feedback data by continuously tagging new training data or generating new cascaded expression for a deterministic classifier and a statistical classifier; and
- completing extraction, via the one or more hardware processors, of the structured data when the NE classifier cluster and the relation classifier cluster undergoes convergence through the retuning, wherein the convergence occurs when a composite F-score exceeds a minimum threshold score.

7. The method of claim 6, wherein the identified expected relation class takes as input a triplet of variables comprising a subject, a predicate, and an object.

8. The method of claim 6, wherein at least one statistical relation classifier trainer is used to automate generation of the training data.

9. The method of claim 6, wherein the conditional random field classifier is trained by automatically tagging the training data.

10. The method of claim 6, wherein the convergence is per relation predicate.

11. A non-transitory, computer-readable medium storing data extraction instructions that, when executed by a hardware processor, cause the hardware processor to:
- identify at least one expected relation class associated with at least one expected relation data;
- populate at least one expected name entity data from the at least one identified expected relation class;
- generate training data by tagging the at least one expected relation data and the at least one identified expected relation class with unstructured or semi-structured data;
- generate feedback data for a relation data and relation class, using a convergence technique on the tagged training data, wherein the convergence technique for generating the feedback data for the relation data and the relation class uses at least a conditional random field classifier;
- retune a NE classifier cluster and a relation classifier cluster based on the feedback data by continuously tagging new training data or generating new cascaded expression for a deterministic classifier and a statistical classifier; and
- complete extraction of the structured data when the NE classifier cluster and the relation classifier cluster undergoes convergence through the retuning, wherein the convergence occurs when a composite F-score exceeds a minimum threshold score.

12. The medium of claim 11, wherein the identified expected relation class takes as input a triplet of variables comprising a subject, a predicate, and an object.

13. The medium of claim 11, wherein at least one statistical relation classifier trainer is used to automate generation of the training data.

* * * * *